United States Patent [19]

Gallagher et al.

[11] 3,884,347

[45] May 20, 1975

[54] APPARATUS FOR ORIENTING ARTICLES HAVING MAGNETIC PROJECTIONS

[75] Inventors: Ronald V. Gallagher, Lexington; Robert R. Swanson, Clemmons, both of N.C.

[73] Assignee: Western Electric Company, Inc., New York, N.Y.

[22] Filed: Dec. 14, 1973

[21] Appl. No.: 425,029

[52] U.S. Cl. .................. 198/254; 198/263; 221/159

[51] Int. Cl. ............................................ B65g 47/24

[58] Field of Search ......... 198/33 AD, 41, 213, 254, 198/263; 221/159, 160, 161, 162

[56] References Cited

UNITED STATES PATENTS

| | | | |
|---|---|---|---|
| 2,015,892 | 10/1935 | Greenlaw | 221/162 |
| 2,334,004 | 11/1943 | Herzog | 198/33 AA X |
| 3,168,185 | 2/1965 | Bader et al. | 198/41 X |

*Primary Examiner*—Evon C. Blunk
*Assistant Examiner*—Douglas D. Watts
*Attorney, Agent, or Firm*—D. J. Kirk

[57] ABSTRACT

An apparatus for orienting articles such as axially leaded tantalum capacitors, each having a magnetic lead at one end and a nonmagnetic lead at the other end. The apparatus includes a pair of counterrotating cylinders spaced apart to form a gap therebetween which is small enough to prevent passage of the capacitors therethrough. The cylinders have magnetic inserts therein which attract the magnetic leads to align the capacitors by pulling the leads into the gap as the cylinders rotate. The capacitors, being too large to pass through the gap, will be supported by the cylinders. Helical grooves cut in the surface of one of the rotating cylinders engage the capacitors, as they are being aligned, to advance the capacitors along the gap to a discharge station. The helical grooves may include a single queuing groove just upstream of the discharge station to receive the capacitors after they have been oriented and to stabilize the capacitors before they are discharged. If a capacitor happens to become misoriented, a rotating disk with magnetic studs attracts and removes the capacitor from the gap before it arrives at the discharge station.

11 Claims, 3 Drawing Figures

PATENTED MAY 20 1975 3,884,347

APPARATUS FOR ORIENTING ARTICLES HAVING MAGNETIC PROJECTIONS

BACKGROUND OF THE INVENTION

1. Field of the Invention

This invention relates to apparatus for orienting and feeding articles, and more particularly, the invention is directed to apparatus for orienting and feeding articles having magnetically distinguishable portions.

2. Description of the Prior Art

In the assembly of printed circuit boards, electrical components are frequently inserted into the boards using automatic component insertion machines. Such machines are fast and accurate and permit significant cost savings in the assembly of large quantities of printed circuit boards. Usually insertion machines are tape fed, i.e., components are mounted on a tape. In order to obtain optimum advantage from the insertion machines, automatic taping machines are used to prepare the necessary tapes for the insertion machines.

In preparing tapes for a given insertion machine, it is frequently necessary to orient certain components so that they will be properly inserted into the printed circuit boards. For example, tantalum capacitors are electrically polarized and must be inserted into a circuit board in a predetermined orientation. However, components used in insertion machines are generally axially leaded and have generally cylindrical bodies. Accordingly, it can be visually impossible to distinguish one end of the component from the other resulting in substantial difficulty in properly orienting such components to be placed on the insertion tapes. Therefore, an apparatus is needed which will present axially leaded components in a predetermined orientation for subsequent feeding to an automatic taping machine prior to component insertion.

The fact that a component is magnetizable lends such a component to be magnetically conveyed and/or segregated. For example, U.S. Pat. No. 1,214,817 employs a rotating armature beneath a conveyor belt to agitate magnetic particles carried on the conveyor. The armature rotates transversely to the direction of travel of the conveyor belt and has a helical pole running the length of the armature. In this manner, a magnetic field travels across the conveyor belt as the armature rotates to displace magnetic particles on the belt transversely to the belt. As a result, the magnetic particles are advanced by the belt. Although such apparatus works well in separating magnetic materials from nonmagnetic materials and in conveying magnetic materials, the apparatus does not have the capability of properly arranging articles in a predetermined orientation.

SUMMARY OF THE INVENTION

The instant invention solves the foregoing problem with apparatus for orienting an article having a body portion with magnetizable and nonmagnetizable poles. The apparatus having a rotatable cylinder, a surface extending adjacent to the rotatable cylinder and spaced from the rotatable cylinder to define a gap therebetween which is narrower than the body portion so that the article is supported between the cylinder and the surface, means for creating a magnetic field in the gap to attract the magnetizable pole into the gap to thereby orient the article and means for moving the oriented article in the gap upon rotating the cylinder to clear the gap to receive and orient a subsequent article.

The invention advantageously achieves orientation of articles by magnetically attracting a magnetic member extending from the article. For example, tantalum capacitors frequently have one copper lead and one nickel lead. As nickel is a magnetic material and copper is nonmagnetic, the magnetic lead can be used to identify one end of the capacitor and to orient same. If an article does not have a magnetic member, a magnetic member can be substituted for a nonmagnetic member, e.g., a nickel lead for a copper lead, or a magnetic material can be attached to a nonmagnetic material, e.g., a length of nickel can be bonded to a copper lead. As will be appreciated, although the invention is particularly useful in orienting electrical components, such as capacitors, any article having a magnetic member extending therefrom can be oriented using the principles of the invention.

DETAILED DESCRIPTION

Figures 1, 2, 3:
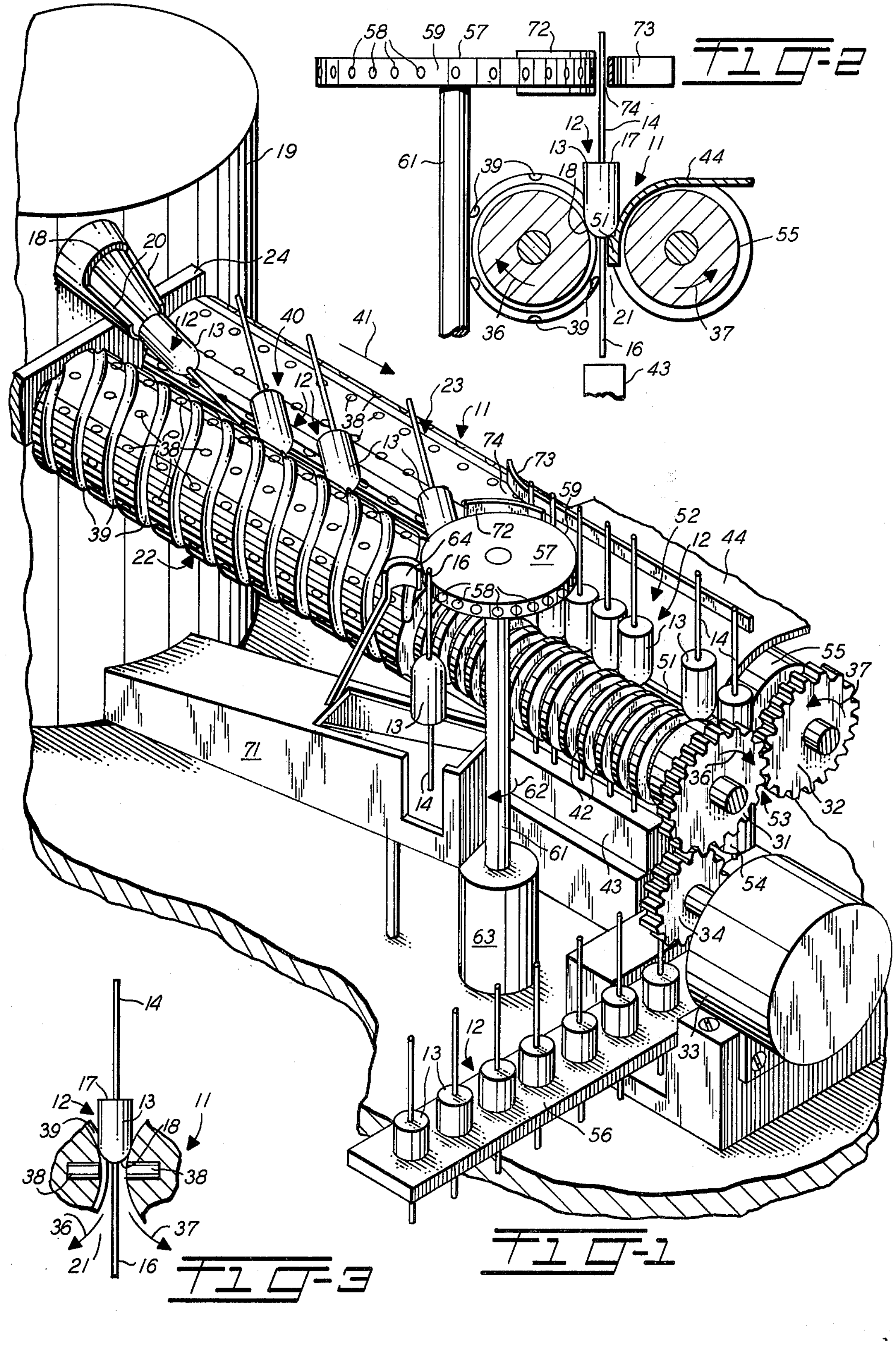
FIG. 1 is an isometric view of an exemplary embodiment of the instant inventive orienting apparatus.
FIG. 2 is a partial cross-sectional view of the apparatus of FIG. 1 showing the components resting on a shelf in the gap between rollers.
FIG. 3 is a partial cross-sectional view of the apparatus of FIG. 1 showing the magnetic studs embedded in rollers on opposite sides of the gap between rollers.

Referring now to the drawings, there is shown in each view an orienting and feeding apparatus, generally designated by the numeral 11, which orients and feeds articles such as electrical components, designated generally by the numerals 12—12, each of which has a magnetic member such as a magnetic lead extending therefrom. In an exemplary embodiment, the electrical components 12—12 are axially leaded tantalum capacitors each of which is polarized electrically, having a substantially cylindrical body portion 13 with a negative lead 14 and a positive lead 16 extending from the ends of the body portion in alignment with the longitudinal axis of the body portion.

Since the tantalum capacitors 12—12 are electrically polarized, it is important that they be oriented correctly when inserted into a printed wiring board (not shown). In order to utilize high speed assembling machinery (not shown), each capacitor 12 must be oriented with the negative lead 14 extending in one direction and the positive lead 16 extending in the opposite direction.

In order to orient these capacitors 12—12 rapidly there must be some readily recognizable feature which can be used to distinguish the positive leads 16 of the capacitors from the negative leads 14. On first impression, the geometry of the capacitors 12—12 appears to provide such a feature in that the body portion 13 of each capacitor has a flat end 17 and a rounded end 18. The negative leads 14 extend from the flat ends 17 and the positive leads 16 extend from the rounded ends 18. Apparatus which recognize the difference between the rounded and flat ends of an article and orient the article accordingly are well known; however, such apparatus has no provision to accommodate situations wherein the flat and rounded ends have axially projecting leads extending therefrom. Application of such apparatus to the instant problem is further complicated when orientation is attempted with capacitors whose leads have somehow become bent in production. The problem then becomes one of finding some other feature which distinguishes one lead of the capacitor from the other.

Generally, tantalum capacitors are made with a copper negative lead 14 and a nickel positive lead 16. The copper negative lead 14 is nonmagnetic; however, the nickel positive lead 16 is magnetic. Consequently, the nickel positive lead 16 can be distinguished magnetically from the copper negative lead 14. As hereinafter described, this orientation is accomplished by the apparatus 11. While the instant exemplary embodiment is directed to orienting tantalum capacitors, it is to be understood that the principles featured in the apparatus 11 can be utilized to orient other articles which have nonmagnetic and magnetic portions. In other words other articles and electrical components such as resistors, inductors, transistors, diodes, etc. may be so configured so as to utilize the apparatus 11 by constructing or modifying such components with magnetic and nonmagnetic leads.

Referring now specifically to FIG 1, the orienting and feeding apparatus 11 is shown receiving the components 12—12 from a feeding chute 18 which delivers the components from a vibrating hopper 19 of conventional design. The feeding chute 18 has converging sides 20 which funnel or channel the components 12—12 as they advance down the feeding chute so that one or the other of leads 14 or 16 precede the body portions 13. In other words, the components 12—12 assume an axial orientation as they advance down the chute 18; however, the positional orientation of the specific leads 14 and 16 is random.

The chute 18 is aligned generally with the length of a gap 21 (see especially FIGS. 2 and 3) which extends along the apparatus 11 and is defined by the space between two parallel cylinders, designated generally by the numerals 22 and 23. Since the chute 18 is aligned with the gap 21, and the components 12—12 are aligned longitudinally in the chute, the components will drop from the chute while in alignment with the gap. The gap 21 is wide enough to let the leads 14 and 16 extend completely therethrough but is narrow enough to prevent passage therethrough of the body portions 13. Consequently, when the components 12—12 are directed into the gap 21 they are then supported by the cylinders 22 and 23.

The chute 18 may be arranged from 0° to 90° from the horizontal plane. However, it has been found that an angle between 10° and 30° provides the best results.

The cylinders 22 and 23 are journaled in a bracket 24 at their upstream end which is the end juxtaposed with the chute 18. At their downstream end, the cylinders 22 and 23 are geared for counterrotation by a pair of meshed spur gears 31 and 32, respectively, which are rigidly attached to the cylinders and supported by a bracket (not shown). A motor 33 drives the gear 31 with a pinion 34 to rotate the gear and the cylinder 22 in a clockwise direction as shown by the arrow 36. Since the gears 31 and 32 are meshed together, the gear 32 and the cylinder 23 will be rotationally driven by the gear 31 in a counterclockwise direction as shown by the arrow 37. By counterrotating the cylinders 22 and 23 in the directions of the arrows 36 and 37 the surfaces of the cylinders, as viewed from above, will move into the gap 21. This tends to encourage the components 12—12 to remain in the gap 21 as they drop therein from the chute 18.

The cylinders 22 and 23 are made of a nonmagnetic self-lubricating material such as "DELRIN" manufactured by the Dupont Company. Each of the cylinders 22 and 23 has a plurality of magnetic inserts or studs 38—38 embedded therein starting at the upstream end that is, the end nearest the hopper 19 of the cylinders and continuing along part of the length of the cylinders. As the cylinders 22 and 23 counterrotate, the magnetic studs 38—38 continually move proximate the gap 21. Since the leads 16 of the components 12—12 are made of a magnetic material, they are attracted by the magnetic studs 38—38 and are pulled down into the gap 21 as the magnets move into the gap. This rotates the leads 14 and 16 about the body portion 13 of the components 12—12 so that the components rest in the gap on their rounded ends 18 with the nonmagnetic leads 14 extending upwardly. The cylinder 22 is provided with a plurality of grooves, such as helical grooves 39—39, and the components 12—12 rest in the grooves with their longitudinal axis at an angle with the horizontal. The components 12—12 thus become oriented with their magnetic leads 16 extending generally downward and their nonmagnetizable leads 14 extending generally upward.

As will be appreciated, the apparatus 11 may be employed to orient any article having a magnetic member extending therefrom. It is only necessary for the magnetic member to be small enough to extend into the gap 21 and for the body portion to be too large to fall through the gap. This permits magnetic studs 38—38 on the rotating cylinders 22 and 23 to pull the magnetic member into the gap 21 to orient the article without the article falling through the gap. If the body portion has a uniform cross-section, the apparatus 11 will orient the article if the smallest transverse dimension of the body portion is larger than the width of the gap 21 and the largest transverse dimension of the magnetic member is smaller than the width of the gap. If the body portion does not have a uniform cross-section, e.g., is conical in shape, the apparatus 11 will orient the article if the smallest transverse dimension of the largest cross-sectional area of the body portion is larger than the width of the gap 21 and the largest transverse dimension of the magnetic member is smaller than the width of the gap.

By using the magnetic studs 38—38, as shown in FIG. 3, the studs can be positioned so that their magnetic poles are aligned when the studs on opposite cylinders 22 and 23 are at their closest proximity in the gap 21. This increases the magnetic force on the leads 16 while these leads are in the gap thereby helping to retain the components 12—12 in a predetermined oriented attitude. The desired alignment of the magnetic studs 38—38 across the gap 21 is readily maintained by providing the portions of the cylinders 22 and 23 in which the studs 38—38 are inserted with the same maximum diameter and rotating the cylinders at the same angular velocity.

The counterrotation of the cylinders 22 and 23 in combination with the magnetic attraction of the magnetic studs 38—38 and the gap 21 provide for the orientation of the components 12—12. In addition, the apparatus 11 moves the components 12—12 continuously and sequentially by the plurality of helical grooves 39—39 formed in the cylinder 22. The grooves 39—39 start at the upstream end of the cylinder 22 and wind around the cylinder to form righthand helixes which advance toward the downstream end of the cylinder as the cylinder rotates in the clockwise direction of the arrow 36. The grooves 39—39 engage the rounded ends 18 of the body portions to advance the component 12—12 downstream in the direction of the arrow 41 as the cylinders 22 and 23 rotate.

Obviously, both cylinders 22 and 23 can be provided with grooves for displacing the components. However, when the cylinders 22 and 23 are made of a self-lubricating material such as DELRIN, the smooth surface of the cylinder 23 does not generate enough sliding friction to hinder the motion of the components 12—12 as they are transported downstream by the grooves 39—39. As a result, the grooves 39—39 in cylinder 22 are adequate for displacing the components. Although the apparatus 11 operates most efficiently when both rollers rotate, it is possible that the non-grooved roller could be fixed or could be any of a variety of stationary flat or curved surfaces as long as it provides support for the component 12 and maintains the desired gap 21.

The magnetic studs 38—38 are preferably inserted between the grooves 39—39 in order to keep the grooves smooth and free of obstructions while mounting the magnetic studs as close as possible to the gap 21. It is highly desirable to maintain close proximity between the magnetic studs 38—38 across the gap 21 because the magnetic force between the studs decreases by the reciprocal of the distance squared between the studs. Consequently, if the studs 38—38 are spaced from the gap 21, the distance between the studs is unnecessarily increased thus decreasing the magnetic force exerted on the leads 16 in the gap and thereby reducing the ability of the studs to attract the leads.

The grooves 39—39 are preferably provided with a relatively long pitch so as to move the components 12—12 rapidly away from the chute 18 once the components land in the gap 21. This is to prevent the components 12—12 from piling up on one another as they fall from the chute. 18. If the components 12—12 start overlapping one another, the leads 14 and 16 may become entangled thereby preventing some of the component from becoming oriented at all which may cause the apparatus to jam. In addition some of the components 12—12 may fall from the apparatus 11 resulting in damage to or loss of the components. These problems are avoided by displacing the components 12—12 rapidly away from the chute 18.

By providing the helical grooves 39—39 with a relatively long pitch there is sufficient distance between each helix to accommodate numerous separate grooves in the cylinder 22. Consequently, by providing a plurality of separate grooves 39—39, there are increased opportunities for the components 12—12 to be transported by a groove. With numerous opportunities for transporting the components 12—12, large numbers can be moved in short period of time by rotating the cylinders 22 and 23 at a relatively high angular velocity.

By giving the grooves 39—39 a relatively long pitch, the components 12—12 carried by the grooves will tend to assume a tilting attitude with the leads 16 in the gap 21 preceding the body portions 13 engaged by the grooves. This is due to the fact that the components 12—12 tend to align themselves with the direction of advance of the grooves 39—39 as the sides of the grooves engage the rounded ends 18 and adjacent parts of the body portions 13 to hold the components in the grooves.

The magnetic studs 38—38 and the grooves 39—39 cooperate to form an orienting zone, generally designated by the numeral 40, which orients and rapidly advances the components 12—12 away from the chute 18. In addition however, it is necessary to remove the oriented components 12—12 from the orienting apparatus 11 without losing the desired orientation. This is complicated by the aforementioned tilting attitude assumed by the components 12—12. The tilting attitude creates an unstable condition since the components 12—12 have a gravitational moment acting thereon which tends to topple them over once they are removed from the grooves 39—39 or once the apparatus 11 is stopped. In addition, the instability of the components 12—12 is further encouraged because the components are moved generally rather fast in order to clear the components away from the point where the chute 18 discharges the components onto the cylinders 22 and 23 thereby preventing jamming of the apparatus 11 and damage to the components. Consequently, it is desirable to stabilize the components 12—12 to facilitate removal of the components from the orienting apparatus 11.

Stabilization is accomplished by shifting the components 12—12 from the grooves 39—39 into a single groove such as helical groove 42. By providing the single groove 42 with a shorter pitch than the grooves 39—39, the slant of the groove 42 is less inclined from the vertical than the slant of the grooves 39—39. Consequently, the components 12—12 tend to assume a generally vertical attitude and are advanced at a slower rate than they were advanced by the grooves 39—39.

To assist in maintaining this vertical attitude a permanent magnet 43 is disposed beneath the gap 21 adjacent to the area of the cylinder 22 having the single groove 42. The magnet 43 is positioned so that the lead 16 projecting down from the gap 21 just clears the magnet (see FIG. 2).

A support 44 of nonmagnetic material, such as copper, is disposed between the single groove 42 and the cylinder 23 to support the components 12—12 after the components leave the grooves 39—39 and while the components are transported by the groove 42. As best seen in FIGS. 1 and 2, the components 12—12 rest on a shelf 51 which is coextensive with and projects from the support 44. The shelf 51 cooperates with the groove 42 to form a queuing zone, generally designated by the numeral 52, in which the components 12—12 are more densely packed than they are in the orienting zone 40 because the helical revolutions of the groove 42 around the cylinder 22 are closer together than the helical revolutions of the grooves 39—39. In the queuing zone 52 the components 12—12 advance through a shorter distance per revolution of the cylinder 22 than the components advance in the orienting zone 40 per revolution of the cylinder 22. Consequently, the components 12—12 advance at a slower rate in the queuing zone 52 than in the orienting zone 40. By slowing down the components 12—12 and giving them a vertical attitude, the groove 42 conditions the components so that they can be discharged from the apparatus 11 while oriented vertically and while moving at a relatively slow lateral speed. speed.

After the components 12—12 are stabilized in the queuing zone 52, it is necessary to discharge them from the apparatus 11 without disturbing the desired orientation. This is accomplished by advancing the components 12—12 to a discharge station, generally designated by the numeral 53, where the aligned components drop through the gap 21 into a discharge tube 54. Referring now to FIG. 2, the diameter of the cylinder 23 is reduced along the portion 55 of the cylinder 23 which is coextensive with the groove 42 of cylinder 22. The diameter of the cylinder 23 is decreased to widen the gap 21 just enough to form a widened section which is wide enough to allow the components 12—12 to drop through the gap. As previously discussed, however, the shelf 51 provides a support for the components 12—12 to prevent them from falling through the gap 21 while they are in the widened section located at the queuing station 52. At the discharge station 53 the shelf 51 simply ends and the components 12—12 drop from the shelf through the gap 21. The discharge tube 54 keeps the components 12—12 oriented as they fall and directs the component to a conventional storage device 56. The storage device 56 maybe indexed beneath the tube 54 to receive each oriented component 12 as the component drops.

It should be clear that the dimensions of the various parts of the instant apparatus will vary relative to size of the component 12 to be oriented. For example, in a specific working embodiment of the instant inventive apparatus which orients a tantalum capacitor having a transverse body dimension of 0.300 of an inch the rollers 22 and 23 are fixed to provide a gap 21 of 0.060 of an inch in the orienting zone 40. The capacitor leads 14 and 16 (both magnetic and nonmagnetic) are 0.032 of an inch thick and approximately 1.5 inches in length. Each of the rollers 22 and 23 are nominally 2 inches in diameter and have arrays of 3/16 inch diameter magnetic studs 38 pressed therein flush with the surface of the rollers. Roller 22 has a plurality of spaced, V-shaped parallel grooves 39—39 therein, which grooves have a width at the surface of the roller 24 of approximately 0.225 of an inch and a depth of 0.094 of an inch. The grooves 39—39 make about one-fourth of a turn per inch on the thick or orienting zone 40 of the roller which is approximately 10.750 inches in length. The downstream or stabilizing portion of roller 22 is nominally 1.750 inches in diameter and has a single V-shaped groove 42 therein which at the surface of the roller is approximately 5/16 inch in width, with a depth of 0.025 of an inch. The groove 42 makes approximately three turns per inch and the reduced portion of roller 23 has a diameter of 1.970 inches.

Occasionally one of the components 12—12 becomes misoriented with its nonmagnetizable lead 14 projecting into the gap 21 and the magnetizable lead 16 projecting upward. When this happens the offending component 12 is picked from queuing station by a rotating disk 57 made of nonmagnetic material which has a plurality of magnets 58 embedded around its periphery 59 that attracts the magnetizable lead 16. The disk 57 is mounted on a shaft 61 which is rotated in the clockwise direction of arrow 62 by a motor 63. When a component 12 is picked up by one of the magnets 58 on the disk 57, the component is carried around until it engages a scraper 64. The scraper 64 engages the lead 16 of the component 12 to move the lead to the nonmagnetic area of the disk periphery 59. This causes the component 12 to fall from the disk 57 into a chute 71 which directs the component back to the hopper 19.

In order to insure that the leads 14 or 16 projecting from the components 12—12 pass in close proximity to the disk 57, the disk is located with its periphery 59 overlaying the gap 21 so that the gap extends generally tangentially to the disk. A pair of arcuate flanges 72 and 73, which form a channel 74 having a flared entrance, guide the upwardly projecting leads 14 (or 16 if the component 12 happens to be misoriented) past the periphery 59 of the disk 57 while holding the leads in close proximity to the periphery of the disk. After guiding the leads 16 past the disk 57 where they are checked magnetically for misorientation, the flange 73 continues to provide support for the components 12—12 in the queuing station 52. In addition, the flanges 72 and 73 perform another useful function in that they will cause a component 12 with a bent lead 14 (or 16 if the component is misoriented) to rotate about its longitudinal axis into close proximity with the disk 57.

BRIEF SUMMARY OF THE OPERATION

The components 12—12 are advanced within a conventional vibrating hopper 19 to a chute 18 from which they slide down onto the apparatus 11. While in the chute 18 the components 12—12 become generally axially oriented as the sides 21 of the chute converge. However, there is no orientation of the components 12—12 with respect to which end 17 or 18 comes first. Since the lead 14 is nonmagnetizable and the lead 16 is magnetizable, the orienting station 40 makes the desired predetermined orientation by attracting the magnetizable leads 16 into the gap 21. The gap 21 extends between the two cylinders 22 and 23 which have magnetic studs 38—38 embedded therein. The magnetic studs 38—38 cause the components 12—12 to tilt upon their rounded ends 18 while the "fast" transporting helical grooves 39—39 in the cylinder 22 engage and advance the components.

Since the components 12—12 assume the general slant of the fast transport helical grooves 39—39, it is desirable to vertically align them before discharging them from the apparatus 11. This is accomplished by shifting the components 12—12 into the single "slow" transporting helical groove 42 in the queuing station 52 which causes the components to assume a vertical attitude. The queuing station 52 terminates at discharge station 53 and the components 12—12 drop through the widened gap 21 into the storage device 56.

If one of the components 12—12 happens to be misoriented, the rotating disk 57 will remove the component from the queuing station by attracting the magnetizable misoriented lead 16 with the magnets 58 embedded in the disk prior to dropping the components into the indexing storage device 56.

What is claimed is:

1. An apparatus for orienting an article having a body portion with magnetizable and nonmagnetizable poles, comprising:

a rotatable cylinder;

a surface extending adjacent to the rotatable cylinder and spaced from the rotatable cylinder to define a gap therebetween which is narrower than the body portion so that the article is supported between the cylinder and the surface;

means for creating a magnetic field in the gap to attract the magnetizable pole into the gap to thereby orient the article; and means for moving the oriented article in the gap upon rotating the cylinder to clear the gap to receive and orient a subsequent article.

2. The apparatus of claim 1 wherein the moving means includes at least one helical groove in the cylinder surface to receive the article and move the article relative to the cylinder as the cylinder rotates.

3. An apparatus for orienting articles having body portions with magnetizable and nonmagnetizable poles comprising:

a pair of cylinders with juxtaposed outer surfaces defining a gap therebetween which is narrower than the body portions but wider than the poles so that the articles may be supported by the surfaces of the cylinders with one or the other of the poles extending into the gap;

means for counterrotating the cylinders to move the surfaces upon which the articles are supported toward the gap so that the articles remain above the gap;

a means for disposing a magnetic field to attract the magnetizable poles into the gap while the articles are supported above the gap to orient the articles with the magnetizable poles extending into the gap; and means for advancing the articles along the gap upon rotating the cylinders to clear the gap to receive and orient subsequent articles.

4. The apparatus of claim 3 wherein the advancing means includes at least one helical groove formed in one of the cylinders which engages the articles and moves the articles along the gap as the cylinders rotate.

5. The apparatus of claim 3 wherein the magnetic field is produced by arrays of magnetic inserts mounted in at least one of the cylinders to attract the magnetizable poles and pull the magnetizable poles into the gap as the cylinders rotate.

6. The apparatus of claim 5 wherein the magnetic inserts are mounted in both of the cylinders and wherein the individual inserts on one cylinder align with corresponding individual inserts on the other cylinder so as to juxtapose the inserts in aligned relation across the gap and create a strong magnetic field in the gap.

7. An apparatus for orienting articles having body portions with magnetizable and nonmagnetizable poles comprising:

a pair of cylinders with juxtaposed outer surfaces defining a gap therebetween which is narrower than the body portions but wider than the poles along a narrower section of the gap, and which is wider than both the poles and body portions along a wider section of the gap so that the articles while in the narrow section are supported by the surfaces of the cylinders and so that the articles can fall through the gap when in the wider section;

means for counterrotating the cylinders to move the surfaces upon which the articles are supported toward the gap so that the articles remain in the gap while in the narrow section;

a means for disposing a magnetic field to attract the magnetizable poles into the gap while the articles are supported in the gap to orient the articles with the magnetizable poles extending into the gap; and helical means disposed on one of said cylinders for advancing the oriented articles in the gap as the cylinders rotate so as to move the articles to the wider section of the gap where the oriented articles fall through the gap.

8. The apparatus of claim 7 wherein the helical means includes:

an array of helical grooves disposed adjacent to the narrow section of the gap wherein each groove in the array has a width wide enough to positively engage a body portion of an article and wherein each groove in the array has a pitch which is long enough to accommodate a plurality of similar grooves between each convolution of each groove so as to advance numerous articles rapidly; and a single groove disposed downstream of the array of grooves, said single groove having a width wide enough to positively engage a body portion and a pitch substantially shorter than the pitch of the grooves in the array so as to vertically align the articles and to advance the articles slower than the array advances the articles to thereby stabilize the articles before they fall through the gap.

9. The apparatus of claim 8 further including a supporting shelf extending partially along the narrow section of said gap and juxtaposed with said single groove to support the articles while the articles are stabilized by the single groove.

10. The apparatus of claim 9 further including means disposed above the gap to attract the magnetizable pole of any article which might happen to be misoriented with the magnetizable pole thereof extending away from the gap instead of into the gap to thereby remove the article from the gap before the misoriented article falls through the gap.

11. An apparatus for orienting axially leaded electrical components each having a body portion with a magnetizable lead extending from one end and a nonmagnetizable lead extending from the other end, comprising:

a pair of cylinders with juxtaposed outer surfaces defining a gap therebetween which is narrower than the body portion but wider than the leads along a narrow section and which is wider than both the leads and body portions along a wider section so that the components while in the narrow section are supported by the surfaces of the cylinders and so that the components fall through the gap when in the wider section;

means for directing the components into the gap;

means for counterrotating the cylinders to move the surfaces upon which the components are supported toward the gap so that the components remain in the gap while in the narrow section;

a means for disposing a magnetic field to attract the magnetizable leads into the gap while the components are supported in the gap to orient the components with the magnetizable leads extending through the gap;

an array of helical grooves disposed adjacent to the narrow section of the gap wherein each groove in the array has a width wide enough to positively engage a body portion of a component and wherein each groove in the array has a pitch which is long enough to accommodate a plurality of similar grooves between each convolution of each groove so as to advance numerous components rapidly; and a single groove disposed downstream of the array of grooves, said single groove having a width wide enough to positively engage a body portion of a component and a pitch substantially shorter than the pitch of the grooves in the array so as to vertically align the article and to advance the components slower than the array advances the articles to thereby stabilize the oriented components before they fall through the gap.

* * * * *